United States Patent [19]

Hodge et al.

[11] 4,110,882

[45] Sep. 5, 1978

[54] COATING ROLLER

[75] Inventors: Gerard Hodge, Brampton; Robert J. Holsgrove, Georgetown, both of Canada

[73] Assignee: Kenhar Products Incorporated, Brampton, Canada

[21] Appl. No.: 844,227

[22] Filed: Oct. 21, 1977

[51] Int. Cl.2 ...................... B60B 7/00

[52] U.S. Cl. ...................... 29/118; 29/129

[58] Field of Search ...................... 29/118, 129; 83/659; 101/415.1

[56] References Cited

U.S. PATENT DOCUMENTS

| | | | |
|---|---|---|---|
| 3,765,329 | 10/1973 | Kirkpatrick et al. | 29/118 X |
| 3,885,486 | 5/1975 | Kirkpatrick et al. | 29/118 X |
| 3,970,001 | 7/1976 | Mollon et al. | 101/415.1 |

FOREIGN PATENT DOCUMENTS

| | | | |
|---|---|---|---|
| 4,955 | 4/1920 | Netherlands | 29/118 |
| 400,814 | 11/1933 | United Kingdom | 29/118 |

*Primary Examiner*—Dorsey Newton

*Attorney, Agent, or Firm*—Cullen, Settle, Sloman & Cantor

[57] ABSTRACT

A coating roller is formed of a cylindrical drum and a replaceable cover. The cover comprises a thin, dimensionally stable, sheet metal substrate upon which is laminated a thick, resilient elastomer layer. The opposite ends of the substrate are provided with springy tongue-like formations which removably fit into and resiliently adjust to opposed, adjacent grooves in the surface of the drum for securing the cover upon the drum. The cover is made by initially forming a flat sheet to the peripheral surface size of the drum, with the tongue-like formations on its opposite ends, and then bending and holding the substrate in a mold having a circular diameter greater than the drum diameter so that the ends of the substrate are widely spaced apart. The elastomer layer is molded upon the substrate and the composite plastic-sheet metal cover is removed from the mold and then applied upon the smaller diameter drum wherein the opposite ends of the substrate are closely adjacent each other.

2 Claims, 13 Drawing Figures

FIG. 1
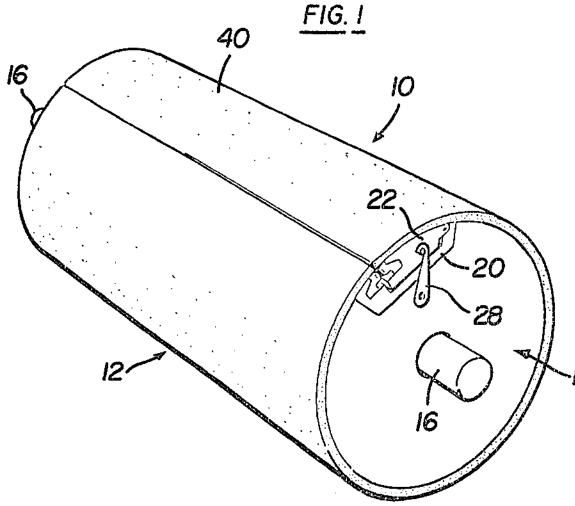
FIG. 2
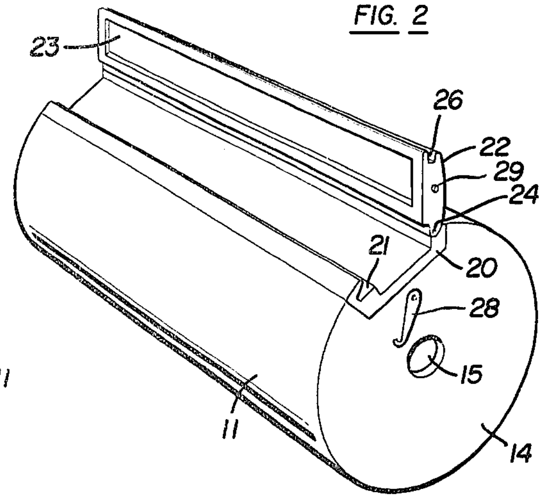
FIG. 4
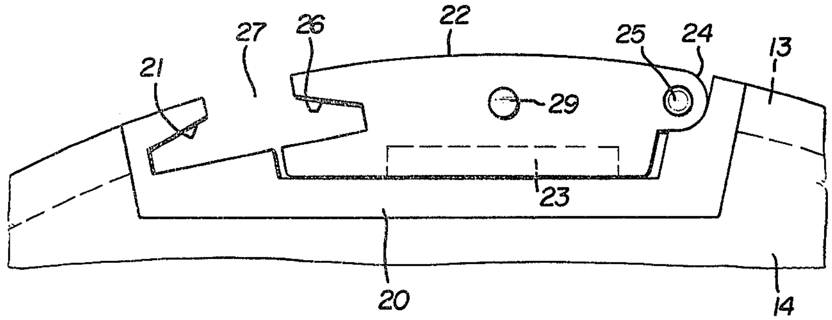
FIG. 3
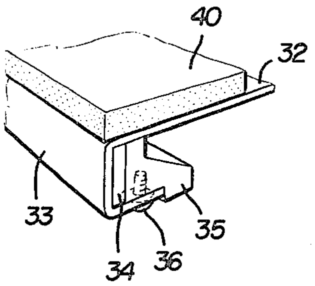
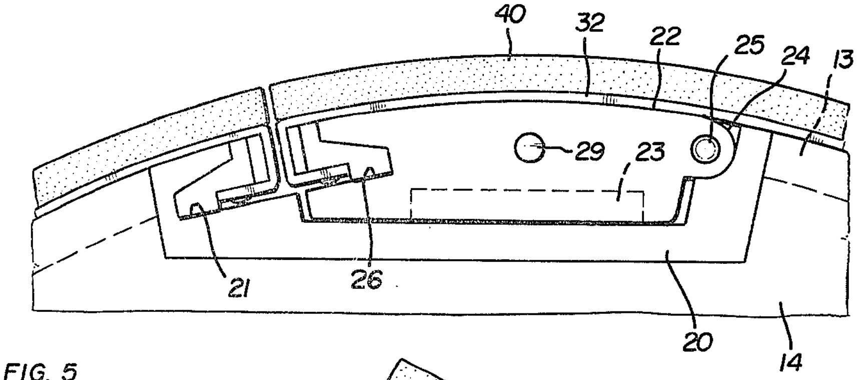
FIG. 5
FIG. 6
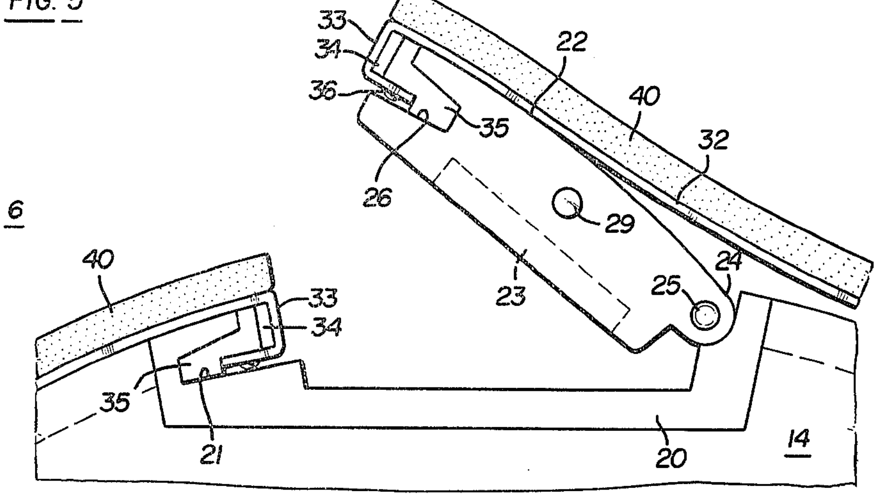

COATING ROLLER

BACKGROUND OF INVENTION

In the manufacture of metal cans, such as out of aluminum or steel sheets, it is common to coat one surface of the sheet before cutting and processing into can sizes and shapes. Typically, such coating is performed by the use of a coating roller which is a relatively large size cylinder, as for example a twelve to fifteen inch diameter and a two to four foot length cylinder, whose outer surface is covered with a resilient elastomer layer that functions as the coating applying surface.

Conventionally, coating rollers of the above described type, are made by first, forming the metal drum and second, casting or molding upon the peripheral surface of the drum the elastomer layer. In order to assure uniformity of coating application, the layer itself must be of an accurate thickness, both longitudinally and concentrically relative to the drum axis. Thus, usually after the layer is applied upon the drum surface, the composite roller-layer cover must be ground or otherwise machined to provide the accurate outer surface.

In use of such rollers, when the elastomer layer wears so as to be out of tolerance or when a roller is changed for another to accomodate to a different kind of coating to be applied to the sheet metal, it is typical to remove the entire roller and replace it with a fresh roller. The used roller is then typically stripped of its plastic and resurfaced.

Thus, in the lines which utilize coating rollers, it is ordinarily necessary to keep a supply of spare rollers available to interchange with worn surface rollers or rollers used for a different coating than needed at the moment.

Such rollers are relatively expensive and in addition, a considerable amount of down time is involved in changing one roller for another. For example, in a typical operation for coating sheet steel or sheet aluminum in a can making process, it could take somewhere between an hour and a quarter to an hour and a half to remove and replace a roller, during which time the line is shut down. In addition, the expense of maintaining spare rollers, and then shipping a used roller to a roller processor and then resurfacing and returning the roller, is relatively expensive.

Hence, the invention herein relates to an improved coating roller which utilizes a removable outer layer or blanket which can be rapidly changed with a fresh cover without the necessity of pulling the roller itself out of the operating position in a manufacturing line, to thereby eliminate the expense and time loss in replacing rollers and in resurfacing rollers.

SUMMARY OF INVENTION

The invention herein contemplates forming the roller drum as a separate unit which normally remains in place in the coating line, with the drum having a replacable blanket or cover applied thereto. The cover or coating layer is formed of a dimensionally stable substrate, such as of thin gauge sheet metal, e.g. twenty gauge, of a size to correspond accurately to the peripheral size and cylindrical shape of the drum. The substrate in turn carries a thick, resilient elastomer layer bonded thereto, e.g., an elastomeric plastic polyurethane material, which forms the coating applying surface.

The opposite ends of the substrate are bent into channels within which are inserted tongue-like formations for interlocking with corresponding grooves formed in the surface of the drum. The interconnection between the tongue-like formations and the drum grooves locks the cover to the drum and permits easy removal and replacement.

It is contemplated to form the drum grooves in the form of two opposing or oppositely extending L-shapes, i.e. back to back, which together make up an undercut or T-shaped slot. One L-shaped groove is formed on a fixed part or edge of the drum. The other L-shaped groove is formed on the edge of a strip-like segment hingedly connected to the drum, which segment can be lifted out of the plane of the drum in order to loosen the substrate relative to the drum or conversely to tighten the substrate upon the drum when the segment is returned to its normal position. Thus, the segment functions like a lever for tightening and locking the substrate to the drum. Either end of the cover may be interlocked with either L-shaped groove, so that the corner is reversible for easier installation upon the drum.

It is also contemplated to form the cover in a novel manufacturing process using what is believed to be a novel mold as follows: namely, the substrate is first prepared in its flat condition to the size and shape of the drum surface and its opposite ends are bent to thus fix the dimensional length corresponding to the circumference of the mounting drum. Thereafter, the substrate is bent around a mandrel in a mold, which mandrel is cylindrical in shape, but of a larger diameter than the drum. This allows the cover to be later handled as a two ended sheet, rather than as a continuous cylinder.

A ring surrounding the mandrel forms a casting space relative thereto so that the cover or blanket is cast in an open cylindrical shape, i.e., a cylinder which is larger in diameter than the drum. Thereafter, when the open cylinder cover is applied to a drum and is tightened upon the drum, it forms a complete cylinder, which is drum sized. This provides for better accuracy, easier manufacturing and better results with respect to required concentricity, coating thickness, etc. In addition, the method of forming the cover and its final construction produces a dimensionally stable cover, which tends to be long lasting in operation and resists surface shifting or crushing during roller operation.

These and other objects and advantages of this invention will become apparent upon reading the following description, of which the attached drawings form a part.

DESCRIPTION OF DRAWINGS

FIG. 1 is a perspective view of the coating roller herein with the cover applied thereto.

FIG. 2 is a perspective view of the roller drum with its strip-like segment pivoted into an open position and the cover removed.

FIG. 3 is an enlarged, perspective view of a fragment of one edge of the cover.

FIG. 4 is an enlarged, end view of a fragment of the roller, showing the grooves and fastening arrangement for the cover.

FIG. 5 is a view similar to FIG. 4, but showing the cover applied.

FIG. 6 is a view similar to FIG. 5, but showing the pivoting movement of the segment for attaching or releasing the cover upon the drum.

DETAILED DESCRIPTION

Figure 7:
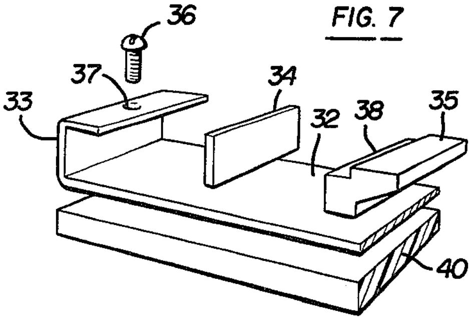
FIG. 7 is a perspective, fragmentary view, of an edge portion of the cover, with the parts separated.
Figure 8:
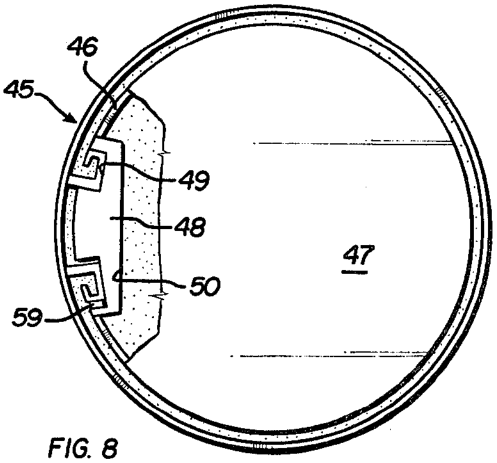
FIG. 8 is an end view, partially fragmented, of the mold for forming the cover.

Referring to FIGS. 1 and 2, the coating roller, generally designated as 10, comprises a drum 11 and a removable drum cover or blanket 12. The drum is formed of thick metal sheet or plate bent into a cylinder 13 having end covers or disks 14 provided with suitable bearings or openings 15 for mounting and/or receiving a mounting shaft or studs 16. The drum itself is appropriately mounted on suitable bearings or supports so that it may be rotated. However, this forms no part of the present invention and the various ways of mounting such drums for coating application are conventional.

The drum cylinder, in this application, is formed with an elongated strip or plate insert 20 appropriately welded to the cylindrical portion of the drum. One edge of the strip or plate is provided with an elongated groove 21 which preferably narrows or tapers inwardly as it increases in depth (see FIG. 4). A cover strip or segment strip 22 is arranged to fit over the insert 20 and has an outer curved surface, corresponding to the curvature of the drum. The segment preferably is formed with a hollow bottom portion 23 for balancing and weight reduction. One edge of the segment is formed with a hinge 24 interengaging with a corresponding hinge section on the insert and secured thereto by a hinge pin 25. The opposite edge of the segment is provided with an edge groove 26 which opposes the groove 21 and is a mirror image thereof. The two grooves, i.e., groove 26 and groove 21, together form a T-shaped or undercut groove 27 whose stem opens at the surface of the drum.

The segment strip 22 is arranged to be manually swung or pivoted out of the cylindrical surface of the drum or alternatively into and forming a continuation of that surface where it is locked in place by means of a conventional hook type latch 28 secured upon each of the end disks 14 and hooking over or catching a pin 29 welded to each of the opposite ends of the segment.

The removable blanket or cover 12 is formed of a dimensionally stable substrate 32, which preferably is formed of thin sheet metal, such as, for example, twenty gauge steel sheet, whose opposite ends are bent into U-shaped channels 33. The sheet, between the channel bends, is accurately sized to correspond to the peripheral surface of the drum.

Resilient padding strips, as for example formed of a resilient polyurethane material, 34 are inserted within each of the channels 33 against the bases thereof. Then, L-shaped, tongue-like strips 35 are inserted into the channels and extend outwardly thereof to form a tongue-like formation for interengaging with the respect grooves 21 and 26 in the insert 20 and segment 22, respectively. The tongue forming strips are preferably made of a rigid material such as of an aluminum extrusion or a rigid polyurethane and are fastened to the free edge of the bent metal channels by means of rivets or screws 36 passing through oversized holes 37 in the metal and arranged within a rabbitted edge 38 of the respective strips, as illustrated in FIG. 7. Thus, the tongue forming strips 35 are slightly springy or circumferentially movable relative to the sheet metal channels within which they are positioned.

Bonded upon the outer surface of the substrate is a relatively thick layer 40 formed of a resilient elastomeric material, such as a polyurethane or polystyrene or the like which material forms the actual applicator surface of the roller. By way of example, the layer may be approximately one half inch in thickness. It should be accurately sized both as to thickness, concentricity, and longitudinal or axial dimensions.

As shown in FIG. 6, the cover or blanket is applied on the roller by swinging open the segment 22, inserting the tongue formation on one edge of the cover into the groove 21, then wrapping the cover around the roller drum, and inserting the opposite tongue-like formation into the groove 26 in the segment. Next the segment 22 is swung back into the surface of the drum, thereby tensioning and locking the cover upon the drum. The segment is locked in position by means of the latch 28.

METHOD OF MAKING REMOVABLE COVER

Figure 10:
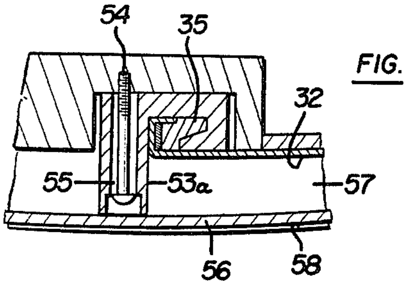
FIG. 10 is a fragmentary, cross sectional view showing the fastening of one end of the substrate within the mold.
Figure 9:
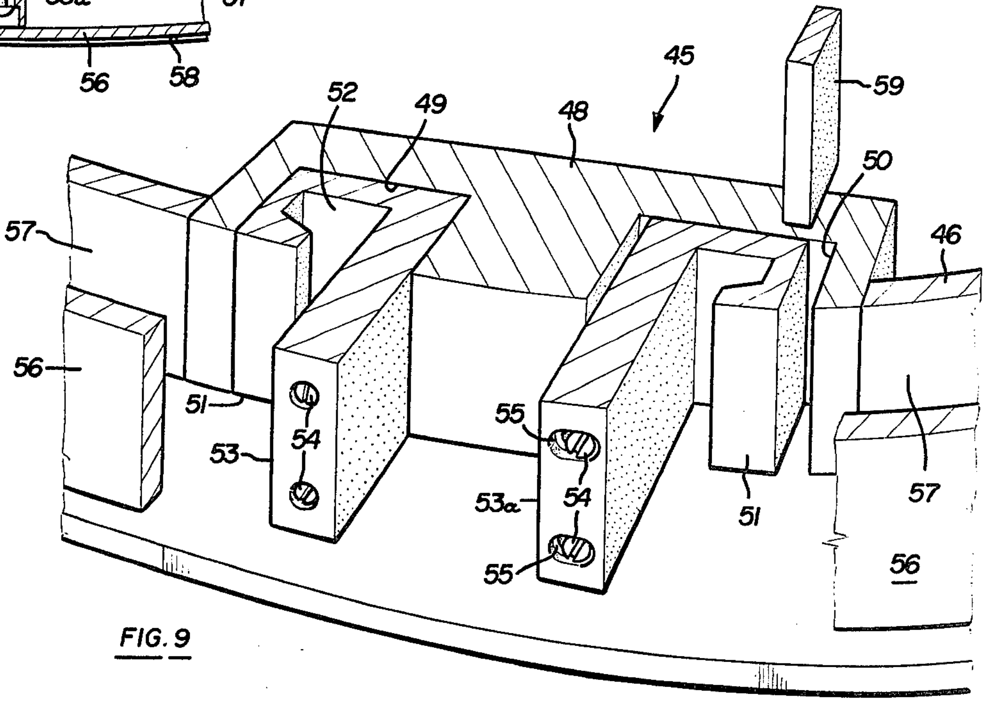
FIG. 9 is an enlarged, perspective, fragmentary view of a portion of the mold wherein the substrate edges are fastened.
Figure 11:
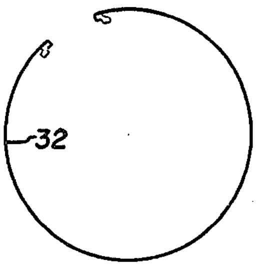
FIG. 11 schematically illustrates the substrate in position for molding the plastic upon its surface.

FIGS. 9–11 illustrate the mold within which the cover is formed. The process for forming the cover involves generally, first laying out a flat metal sheet to correspond dimensionally, both in length and width, to the peripheral surface of the drum. The opposite ends of the sheet are bent into the channels 33, with the distance between the bent channels accurately corresponding to the circumference of the drum.

Next the resilient padding strips 34 are inserted within the channels, followed by insertion of the L-shaped rigid strips 35 which are then fastened thereto by the rivets or screws 36 extending through the oversize holes 37. At this point the substrate is still flat.

Next, the substrate is positioned within a mold 45 for molding the resilient layer 40 thereon. The mold comprises a cylindrical mandrel or drum 46 whose diameter is greater than the diameter of the roller drum. The mandrel is preferably formed of heavy metal sheet or plate which is bent into a cylindrical shape and provided with disk-like end covers 47 welded thereto.

The cylinder is formed with a longitudinal opening which is filled by an insert plate 48 welded to the adjacent edges of the sheet metal forming the mandrel 46. Parallel spaced channels 49 and 50 are found in the insert, with the channel 50 being wider than the other channel.

Similar, but reversely oriented, groove strips 51 are arranged in each of the channels 49 and 50, with each groove strip having a groove 52, shaped similarly to the undercut grooves 21 and 26 in the drum.

The side legs 53 of the groove strips extend radially outwardly of the mandrel cylinder shape to form stops as well as to receive screws 54 for fastening the groove strips to the mandrel insert plate. Preferably, the groove strip arranged in the wider channel 50, is provided with widened slots 55 to receive the screws 54 (see FIG. 11) so that the strip may be circumferentially adjusted simply by loosening its screws, manually adjusting the location of the strip by driving a tapered wedge 59 between the strip and adjacent channel and then tightening the screws again. If desired, both of the groove strips may be made with the widened slots for adjusting both.

A cylindrical ring or sleeve 56 surrounds the mandrel to provide a casting or molding space 57 there between. In addition, a base plate 58 (see FIG. 10) is arranged at the opposite ends of the mandrel and ring to close off the space.

In operation, the flat substrate, with the tongue-like formations is wrapped around the mandrel with the tongue forming strips 35 arranged within the respective grooves 52 of the groove strips 51. Thus, the substrate is in face to face contact with the mandrel surface and is spaced from the inner surface of the cylindrical ring 56.

The elastomer material to be molded upon the substrate is inserted into the space 57 and utilizing conventional casting or molding techniques, which might include heating, depending on the kind of elastomer involved, the material is liquid poured in place and simultaneously cures and bonds to the substrate to form the composite cover or blanket structure. Upon completion of the molding and bonding steps, the end plates 58 may be removed and thereafter the ring 56 slipped off the mandrel and the cover removed endwise from the mandrel.

Figure 12:
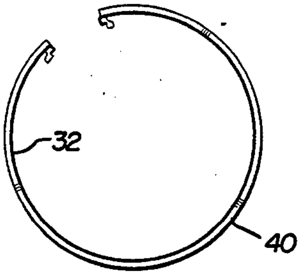
FIG. 12 schematically shows the substrate with the plastic layer molded thereon, and FIG. 13 schematically shows the composite cover or blanket in position as if locked upon the roller drum.
Figure 13:
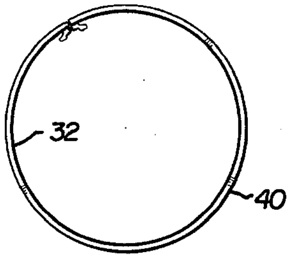

As illustrated in FIGS. 12 through 14, the substrate is bent into a cylindrical shape of a diameter which is larger than the roller drum, during the casting or molding process (see FIG. 12). Thus, when the elastomer layer is applied, and the cover removed from the mold (see FIG. 13) the cover forms an open cylinder. However, when the cover is applied upon the drum, the cylindrical shape closes into a cylinder of a diameter corresponding to the diameter of the drum (see FIG. 14).

By way of example, for a fifteen inch diameter, forty-eight inch long coating roller, having a one-half inch thick foam polyurethane layer for applying a lacquer coating upon sheet steel, the gap between the ends of the substrate during molding may be on the order of about four to five inches. The gap is closed when the cover is applied upon the roller drum.

The user of the coating rollers relating to this invention, can now stock a number of covers for application upon a single roller which is mounted within the coating line. Such covers may be applied and removed rapidly, as for example within fifteen minutes or so as compared to the lengthy operation required to remove a complete roller and replace it as has been done in the past.

Having fully described an operative embodiment of this invention, we now claim:

1. A coating roller cover for removable mounting upon an elongated, cylindrically shaped roller drum to provide the coating applying surface, comprising:

an initially flat, thin, dimensionally stable substrate sheet, such as of thin gauge sheet material, of a size to completely surround the drum surface;

a thick layer of resilient foam plastic material bonded to and covering the substrate for forming the coating applying surface of the roller;

tongue-like connector means formed upon the opposite edges of the substrate sheet adapted for interconnecting with cooperating mounting means formed on the drum surface for releasably fastening the cover upon the drum;

whereby accurately dimensioned covers may be bent around and fastened upon the drum peripheral surface and replaced when worn by similar covers;

said tongue-like connector means each comprising U-shaped channels bent out of the free edges of the sheet on the uncoated surface of the substrate, and a generally L-shaped rigid strip arranged within the channel and having a leg extending out of the channel and spaced from the uncovered surface of the substrate, wherein said tongue-like connectors are adapted to fit into an inverted, i.e., — undercut, T-shaped groove formed in and extending axially of the surface of the drum, with each connector fitted within a half of the tongue-shaped groove.

2. A construction as defined in claim 1, and including a resilient padding strip arranged within the channel between the sheet metal base thereof and the adjacent leg of the rigid strip for providing a limited springy movement of the rigid strip relative to the substrate.

* * * * *